United States Patent [19]
Dempsey

[11] Patent Number: 5,622,777
[45] Date of Patent: Apr. 22, 1997

[54] HEAT-RESISTANT REINFORCED FOAM

[75] Inventor: Michael P. Dempsey, Aliquippa, Pa.

[73] Assignee: Bayer Corporation, Pittsburgh, Pa.

[21] Appl. No.: 442,622

[22] Filed: May 17, 1995

[51] Int. Cl.$^6$ ........................................ B32B 27/00
[52] U.S. Cl. .................... 442/374; 521/122; 521/163; 521/170; 521/172; 521/173; 521/174; 521/176
[58] Field of Search ................................. 521/122, 163, 521/170, 174, 172, 176, 173

[56] References Cited

U.S. PATENT DOCUMENTS

| Re. 33,609 | 6/1991 | Nodelman | 264/53 |
|---|---|---|---|
| 4,381,352 | 4/1983 | McBrayer | 521/115 |
| 4,581,387 | 4/1986 | Werner et al. | 521/128 |
| 4,696,954 | 9/1987 | Pritchard et al. | 521/167 |
| 4,945,120 | 7/1990 | Kopp et al. | 521/163 |
| 5,208,269 | 5/1993 | Brown | 521/125 |
| 5,334,673 | 8/1994 | Wu | 273/235 R |
| 5,389,696 | 2/1995 | Dempsey et al. | 521/128 |

Primary Examiner—Morton Foelak
Attorney, Agent, or Firm—Joseph C. Gil; Richard E. L. Henderson

[57] ABSTRACT

This invention relates to a process for preparing a heat-resistant reinforced polyurethane/polyurea foam by
(A) preparing, at an isocyanate index of about 100 to about 115, a foamable reaction mixture comprising
  (a) an organic polyisocyanate;
  (b) 0 to about 80% by weight, based on the total amount of components (b), (c), and (d), of an isocyanate-reactive compound containing two or more isocyanate-reactive groups and having a number average molecular weight of from 400 to about 10,000;
  (c) about 10 to about 90% by weight, based on the total amount of components (b), (c), and (d), of an isocyanate-reactive compound containing two or more isocyanate-reactive groups other than amino groups and having a molecular weight of from 32 to 399; and
  (d) about 5 to about 35% by weight, based on the total amount of components (b), (c), and (d), of certain organic amines containing at least one amino group having a moderated reactivity toward the organic polyisocyanate, as indicated by a gel time exceeding about 5 seconds measured from the material initiation time at 25–40° C., and having a number average molecular weight of from 86 to 400; and
(B) introducing foamable reaction mixture (A), while said reaction mixture (A) is still fluid, into a mold containing about 12 to about 35% by weight of a fibrous mat having a weight per unit area of about 225 g/m$^2$ to about 750 g/m$^2$.

13 Claims, No Drawings

HEAT-RESISTANT REINFORCED FOAM

BACKGROUND OF THE INVENTION

The present invention relates to heat-resistant reinforced polyurethane/polyurea foams prepared by the reaction of organic polyisocyanates with isocyanate-reactive compositions containing organic diamines having moderated reactivity toward organic polyisocyanates.

Reinforced urethane-based foams prepared by reaction injection molding are known. E.g., U.S. Pat. Nos. 4,696,954, 5,208,269, and 5,389,696 and reissued U.S. Pat. Re 33,609. Reinforced foams can be prepared by introducing the reactants into a mold containing a reinforcing material in the form of fibrous mats.

An object of the present invention was to obtain improved heat performance of reinforced polyurethane/polyurea foams while at the same time maintaining a processable reaction profile. It has now been found possible to obtain such advantageous properties by using organic amines having moderated reactivity toward organic polyisocyanates.

SUMMARY OF THE INVENTION

This invention relates to a process for preparing a heat-resistant reinforced polyurethane/polyurea foam comprising (A) preparing, at an isocyanate index of about 100 to about 115, a foamable reaction mixture comprising
  (a) an organic polyisocyanate;
  (b) 0 to about 80% by weight, based on the total amount of components (b), (c), and (d), of an isocyanate-reactive compound containing two or more isocyanate-reactive groups (preferably a polyether polyol) and having a number average molecular weight of from 400 to about 10,000 (preferably 3000 to 7000, more preferably 4200 to 6100);
  (c) about 10 to about 90% by weight, based on the total amount of components (b), (c), and (d), of an isocyanate-reactive compound containing two or more isocyanate-reactive groups other than amino groups (preferably hydroxyl groups) and having a molecular weight of from 32 to 399; and
  (d) about 5 to about 35% by weight (preferably 10 to 20% by weight), based on the total amount of components (b), (c), and (d), of an organic amine containing at least one amino group having a moderated reactivity toward the organic polyisocyanate, as indicated by a gel time exceeding about 5 seconds (preferably 10 to 45 seconds) measured from the material initiation (cream) time at 25°–40° C., and having a number average molecular weight of from about 86 to about 400, said organic amine being selected from the group consisting of
    (1) a sterically hindered aromatic amine (preferably a diamine) in which one or more aromatic ring substituents (preferably $C_1$–$C_6$ alkyl groups) are situated ortho to the amino groups,
    (2) an aromatic amine other than amine (d)(1) (preferably a diamine) in which at least one of the amino groups exhibits reduced reactivity due primarily to electronic effects rather than steric factors,
    (3) an aromatic or non-aromatic amine (preferably a diamine) having secondary amino groups,
    (4) a non-aromatic amine (preferably a diamine) having sterically hindered primary amino groups, and
    (5) mixtures thereof; and (B) introducing foamable reaction mixture (A), while said reaction mixture (A) is still fluid, into a mold containing about 12 to about 35% by weight (preferably 15 to 25% by weight) of a fibrous mat (preferably a fiberglass mat) having a weight per unit area of about 225 g/m² to about 750 g/m² (preferably 300 g/m² to 600 g/m²).

DETAILED DESCRIPTION OF THE INVENTION

Suitable organic polyisocyanates (a) include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such isocyanates include those having the formula $$Q(NCO)_n$$

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecamethylene diisocyanate; cyclobutane-1,3-diisocyanate; cyclohexane-1,3- and -1,4-diisocyanate, and mixtures of these isomers; 1-isocyanato-2-isocyanatomethylcyclopentane; 1-isocyanato- 1-methyl-3- and/or -4-isocyanatomethylcyclohexane; 1,3-and 1,4-bis(isocyanatomethyl)cyclohexane; 1-isocyanato-3,3,5-trimethyl-5-isocyanatomethylcyclohexane ("isophorone diisocyanate"; see, e.g. German Auslegeschrift 1,202,785 and U.S. Pat. 3,401,190); 2,4-and 2,6-hexahydrotoluene diisocyanate and mixtures of these isomers; dicyclohexylmethane-4,4'-diisocyanate ("hydrogenated MDI", or "HMDI"), including the t,t-, c,t-, and c,c-isomers thereof; dicyclohexylmethane-2,4'-diisocyanate; 1,3-and 1,4-phenylene diisocyanate; 2,4- and 2,6-toluene diisocyanate and mixtures of these isomers ("TDI"); α,α,α',α'-tetramethyl-1,3- and/or-1,4-xylylene diisocyanate; diphenylmethane-2,4'- and/or -4,4'-diisocyanate ("MDI"); naphthylene-1,5-diisocyanate; triphenylmethane-4,4',4''-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048;

modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above. It is generally preferred to use polyphenyl-polymethylene-polyisocyanates of the type obtained by condensing aniline with formaldehyde, followed by phosgenation.

Suitable polyisocyanates (a) also include isocyanate-terminated prepolymers prepared by reaction of any of the above polyisocyanates with a substoichiometric amount of an isocyanate-reactive compound, preferably a hydroxyl- or amino-containing compound, such as those disclosed hereinafter for use in accordance with the present invention. See, for example, U.S. Pat. No. 4,374,210. Preferred prepolymers are based on polyether or polyester polyols and, optionally, low molecular weight chain extenders. Blends of any of the previously disclosed polyisocyanates may also be used in accordance with the present invention.

Suitable isocyanate-reactive compounds (b) include compounds that contain hydroxyl groups, amino groups, thiol groups, carboxyl groups, or a combination thereof, the preferred compounds being those containing hydroxyl groups. Particularly preferred isocyanate-reactive compounds contain 2 to 8 (preferably 2 to 4) hydroxyl groups and have a molecular weight of from 3000 to 7,000 (most preferably 4200 to 6100), including for example, hydroxyl-containing polyethers, polyesters, polyacetals, polycarbonates, polyesterethers, polyester carbonates, polythioethers, polyamides, polyesteramides, polysiloxanes, polybutadienes, and polyacetones, and can optionally contain one or more isocyanate-reactive amino groups. Polyether polyols are particularly preferred. Isocyanate-reactive amino compounds (b) do not, of course, include compounds falling within the definition of component (d).

Suitable polyether polyols are known and may be prepared, for example, by the polymerization of epoxides, optionally in the presence of a catalyst such as $BF_3$, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,2- or 1,3-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152, 536) are also suitable, as are polybutadienes containing hydroxyl groups. Particularly preferred polyethers include polyoxyalkylene polyether polyols, such as polyoxyethylene, polyoxypropylene, polyoxybutylene, and polytetramethylene diols and triols.

Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endo-methylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, 1,3- and 1,4-bis(hydroxymethyl)cyclohexane, 2-methyl- 1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polyester carbonates include those prepared by the reaction of polyester diols, with or without other diols such as 1,3-propanediol, 1,4-butanediol, 1,6-hexanediol, diethylene glycol, triethylene glycol, tetraethylene glycol, or thiodiglycol, with phosgene, cyclic carbonates, or diaryl carbonates such as diphenyl carbonate. Suitable polyester carbonates more generally include compounds such as those disclosed in U.S. Pat. No. 4,430,484.

Suitable polythioethers include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyesteramides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used according to the invention, provided that the molecular weights range from about 400 to about 10,000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for the process of the invention. Synthetic resins with exceptional flame resistance may be obtained by using polyether polyols that have been modified by graft polymerization with vinyl phosphonic acid esters and optionally acrylonitrile, methacrylonitrile, acrylamide, methacrylamide, or hydroxy-functionalized acrylic or methacrylic acid esters according to German Offenlegungsschriften 2,442,101, 2,644,922, and 2,646,141.

Suitable, although less preferred, hydroxyl-containing compounds include organofunctional polysiloxanes containing two terminal isocyanate-reactive groups and structural units of the formula —O—Si(R)$_3$ in which R denotes a $C_1$–$C_4$ alkyl group or a phenyl group, preferably a methyl group. Both the known, pure polysiloxanes containing organo-functional end groups and the known siloxane polyoxyalkylene copolymers containing organofunctional end groups are suitable starting materials according to the invention.

General discussions of representative isocyanate-reactive compounds that may be used according to the present invention can be found, for example, in *Polyurethanes, Chemistry and Technology* by Saunders and Frisch, Interscience Publishers, New York, London, Volume I, 1962, pages 32–42 and pages 44–54, and Volume I, 1964, pages 5–6 and 198–199, and in *Kunststoff-Handbuch*, Volume VII, Vieweg-Höchtlen, Carl-Hanser-Verlag, Munich, 1966, on pages 45 to 71.

Also suitable for use as component (b) are the so-called amine-terminated polyethers containing aromatically and/or aliphatically (preferably aliphatically) bound isocyanate-reactive primary or secondary amino groups, provided that such compounds do not fall within the definition of component (d). Compounds containing amino end groups can also be attached to the polyether chain through urethane or ester groups. These amine-terminated polyethers can be prepared by any of several methods known in the art. For example, amine-terminated polyethers can be prepared from polyhydroxyl polyethers (e.g., polypropylene glycol ethers) by a reaction with ammonia in the presence of Raney nickel and hydrogen (Belgian Patent 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in French Patent 1,551,605. French Patent 1,466,708 discloses the preparation of polyethers containing secondary amino end groups. Also useful are the polyether polyamines described in U.S. Pat. Nos. 4,396,729, 4,433,067, 4,444,910, and 4,530,941.

Relatively high molecular weight polyhydroxy-polyethers suitable for the process of the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are preferred amine-terminated polyethers. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595, and 5,283,364.

Aminocrotonate-terminated derivatives of polyethers, as well as of other polyols described above, can be prepared from acetoacetate-modified polyethers as described, for example, in U.S. Pat. Nos. 5,066,824, 5,151,470, 5,231,217, and 5,356,946.

Other suitable amine-terminated polyethers include aminophenoxy-substituted polyethers described, for example, in European Patent Applications 288,825 and 268,849, again provided that such compounds do not fall within the definition of component (d).

Amine-terminated polyethers suitable for use in the present invention are in many cases mixtures with any of the above-mentioned compounds. These mixtures generally should contain (on a statistical average) two to three isocyanate reactive amino end groups.

Suitable isocyanate-reactive compounds (c) containing two or more isocyanate-reactive groups other than amino groups (i.e., chain extenders and crosslinkers) have a molecular weight of from 32 to 399. Suitable isocyanate-reactive groups include hydroxyl groups or, less preferably, thiol groups. Examples of suitable hydroxyl-containing chain extenders and crosslinkers include glycols and polyols, such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-1,3-propanediol, 2-methyl-1,3-propanediol, diethylene glycol, glycerol, 1,2,6-hexanetriol, 1,2,4-butanetriol, trimethylolethane, and trimethylolpropane.

Suitable organic amines (d) contain at least one amino group that exhibits an attenuated reactivity toward organic polyisocyanates, as indicated by gel times exceeding about 5 seconds (preferably 10 to 45 seconds) as measured from the material initiation (cream) time at 25°–40° C. Reactivities of the attenuated-reactivity amino groups can be moderated by steric effects and/or electronic effects. Compare U.S. Pat. No. 5,334,673.

Suitable amines (d) include sterically hindered aromatic amines (d)(1) in which one or more aromatic ring substituents (preferably $C_1$–$C_6$ alkyl groups) are situated ortho to the amino groups. It is, of course, possible for such compounds to include substituents that inhibit reactivity by electronic effects. Examples of such hindered aromatic amines include diamines such as 1-methyl-3,5-bis(methylthio)-2,4- and/or-2,6-diaminobenzene, 1,3,5-triethyl-2,4-diaminobenzene, 1,3,5-triisopropyl-2,4-diaminobenzene, 1-methyl-3,5-diethyl-2,4- and/or-2,6-diaminobenzene ("DETDA"), 4,6-dimethyl-2-ethyl- 1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane.

Suitable amines (d) also include other aromatic amines (d)(2) in which reactivity is primarily determined by electronic effects rather than steric factors. It is, of course, possible for such compounds to include sterically hindered amino groups as well. Examples of suitable aromatic amines include those containing deactivating substituents (such as halogens, nitro, or carbonyl groups), especially diamines such as halogenated diaminodiphenylmethanes (for example, 3,3'-dichloro-4,4'-diaminodiphenylmethane ("MOCA") and 3-chloro-4,4'-diaminodiphenylmethane (in which the amino group attached to the chlorinated aromatic ring is left exposed)), and 4-(4'-aminobenzyl)cyclohexylamine ("½ PACM").

Examples of aromatic or non-aromatic amines (d)(3) having secondary amino groups include N,N'-dialkyl-p-phenylenediamines, N,N'-dialkylaminodiphenylmethanes, and piperazine or sterically hindered derivatives thereof.

Examples of non-aromatic amines (d)(4) having sterically hindered primary amino group include 2-methyl-2-aminopropanol.

Suitable fibrous mats for use as component (e) can be made from natural fibers such as burlap, jute, and coconut or synthetic fibers such as glass fibers, nylon fibers, polyester fibers, aramid fibers, liquid crystal fibers, and carbon fibers. Fiberglass mats are particularly preferred.

It is also possible, but generally less preferred, to include known fillers and/or reinforcing substances, such as barium sulfate, calcium carbonate, talc, wollastonite, hydrated alumina, clay, kieselguhr, whiting, mica, inorganic or organic microspheres, rigid inorganic or organic fibers, and glass flakes. When such materials are used, glass fibers, particularly milled glass fibers having a diameter that ranges from about 7.5 to about 20 micrometers, are preferred. The additional fillers and/or reinforcing materials may be added in quantities of up to about 18% by weight (preferably up to 15% by weight) based on the total quantity of the reinforced polyurethane/polyurea.

Other additives may optionally also be used in the process of the present invention. Suitable additives include, for example, catalysts, blowing agents, surface-active additives, cell regulators, pigments, dyes, UV stabilizers, plasticizers, and fungistatic or bacteriostatic substances.

Reinforced polyurethane/polyurea foams prepared according to the invention can be prepared using any of the specified relative amounts of components (b), (c), and (d). However, it is generally preferred to prepare reinforced foams using the isocyanate-reactive components in either of two more narrowly defined quantity ranges. For one type of foam, component (b) is omitted altogether and the amount of component (c) ranges from about 80 to about 90% by weight and the amount of component (d) ranges from about 10 to about 20% by weight, the individual amounts being based on the total amount of components (c) and (d). The reactive system used for this type of foam is typified by low viscosity for easy permeability of the fibrous mat, by rapid reaction, and by quick demolding of the foam product. For the second type of foam, the amount of component (b) ranges from about 20 to about 80% by weight, the amount of component (c) ranges from about 10 to about 70% by weight, and the amount of component (d) ranges from about 10 to about 20% by weight, the individual amounts being based on the total amount of components (b), (c), and (d). The reactive system used for the second type of foam is typically used to prepare foams having specific properties, such as impact resistance, elongation, and other physical properties, that may not be available when using the first type of system.

Foams produced according to the present invention may be prepared by introducing the reaction mixture into a suitable mold using the reaction injection molding ("RIM") process. The reaction components (that is, the polyisocyanate, isocyanate-reactive compounds, and any other materials such as catalysts, blowing agents, and other additives and auxiliaries used in the present invention) may be reacted by the known one-stage process, by the prepolymer process, or by the semi-prepolymer process. Machines, such as those described in U.S. Pat. No. 2,764,565, may be used in these processes. Particulars of the processing machines which may also be used to produce polyurethanes according to the invention may be found in Kunststoff-Handbuch, Vol. VII, Vieweg and Höchtlen, Carl-Hanser-Verlag, Munich 1966, pages 121 to 205. Suitable mold materials include metals (for example, aluminum or steel) or plastics (for example, unsaturated polyester resin or epoxide resin). In the mold, the foamable reaction mixture foams to form the molded product. In-mold foaming may be carried out in such a way that the molding has a compact skin and a cellular core. It is possible to introduce into the mold a quantity of foamable reaction mixture such that the foam formed just fills the mold. It is also possible to introduce into the mold more foamable reaction mixture than is required to fill the interior of the mold with foam, technique known as "over-charging" and described, for example, in U.S. Pat. Nos. 3,178,490 and 3,182,104. External release agents, such as silicone oils, are often used during in-mold foaming. It is, however, preferable to use so-called "internal release agents", optionally in admixture with external release agents, as described, for example, in U.S. Pat. No. 5,389,696 and German Offenlegungsschriften 2,121,670 and 2,307,589.

When carrying out the process of the present invention, the quantity of polyisocyanate should preferably be such that the isocyanate index is from about 100 to about 115, preferably 105 to 110. By "isocyanate index" is meant the quotient of the number of isocyanate groups divided by the number of isocyanate-reactive groups, multiplied by 100. When calculating the isocyanate index, any isocyanate-reactive groups possibly present in the mold release agents (e.g., carboxyl groups) are not taken into account.

The heat-resistant reinforced polyurethane/polyureas according to the present invention are useful for automotive applications, including automotive interior or exterior trim pieces such as door trim panels, package shelves, instrument panel covers, quarter panels, spoilers, and various decorative trim pieces.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

In the following examples, a series of molded polyurethane/polyurea plaques were made using a base system, with or without a diamine having moderated reactivity toward organic polyisocyanates. The reactive systems used to prepare the plaques were two-component RIM systems in which the isocyanate component was a typical polymeric diphenylmethane diisocyanate and the isocyanate-reactive component was a mixture of polyether polyols, aromatic amines, and/or other organic compounds having isocyanate-active hydrogen, surfactant, blowing agent, and catalyst.

A Krauss Maffei HK-245 two-component RIM machine equipped with a heated steel mold was used to prepare flat plaques having a surface area of about 0.25 square meters. The isocyanate-reactive component was transferred to the polyol tank of the RIM machine and stirred with a mechanical agitator used to keep the material homogeneous. The isocyanate and isocyanate-reactive components were separately pressurized with nitrogen and maintained at a temperature of between 30° and 35° C. The surface of each mold was pretreated with a conventional paste wax, RCT-C 2080, available from ChemTrend, Inc., and then sprayed with an external mold release agent, AQUALEASE 2731, available from George Mann & Co., Inc. A fiberglass mat weighing about 300 g/m², available from Nicofibers, was placed in the mold. The isocyanate and isocyanate-reactive components were impingement mixed at ratios that gave an isocyanate index of 105 to 110 and dispensed into the mold (mold temperature of 65° C.). After the reaction mixture was cured for 60 to 120 seconds, the mold was opened and the plaque removed. Any mold used to make more than one plaque was sprayed with external mold release agent before being reused.

Thermal properties of the plaques were determined by measuring heat sag according to ASTM D3769 (six-inch overhang).

The following starting materials were used in the examples:

Isocyanate: A polymethylene poly(phenyl isocyanate) having an isocyanate group content of about 32.5% by weight and containing about 58% by weight of diisocyanate, in which the diisocyanate comprised about 13% by weight of 2,4'-methylene bis(phenyl isocyanate) and about 45% by weight of 4,4'-methylene bis(phenyl isocyanate), available commercially as MONDUR, 582 from Bayer Corporation Polyol A: Adduct of glycerin with propylene oxide having a molecular weight of about 160

Polyol B: Adduct of glycerin with propylene oxide having a molecular weight of about 358

Polyol C: Adduct of glycerin with propylene oxide having a molecular weight of about 4809

Diamine: A mixture of 3,5-dimethylthio-2,4-toluenediamine and 3,5-dimethylthio-2,6-toluenediamine available commercially as ETHACURE 300 from Albemarle Corp.

Additive A: Surfactant commercially available as L-6980 from OSi Specialties

Additive B: Compatibilizer that is the reaction product of N,N-dimethylpropylene diamine with tall oil and available commercially as Zusatzmittel VP PU-1748 from Bayer AG, Germany Catalyst A: A tertiary amine catalyst available commercially as DESMORAPID PV from Bayer AG, Germany Catalyst B: A tertiary amine catalyst available commercially as DABCO SA-610/50 from Air Products Example 1

(comparison)

Example 1 was a control containing no diamine. The composition of the isocyanate-reactive component is shown in Table 1.

TABLE 1

| Isocyanate-reactive Components for Comparison Example 1 | |
|---|---|
| Component | Quantity (parts by wt.) |
| Polyol A | 40 |
| Polyol B | 38 |
| Polyol C | 15 |
| Additive A | 1.5 |
| Additive B | 3 |
| Water | 0.9 |
| Catalyst A | 0.5 |
| Catalyst B | 1.1 |

The isocyanate-reactive blend was allowed to react with the isocyanate at an isocyanate index of 105 to form polyurethane plaques. Physical properties of these plaques are shown in Table 4.

Example 2

The method of Example 1 was repeated except that an aromatic diamine was included among the isocyanate-reactive components. The composition of the isocyanate-reactive component is shown in Table 2. Physical properties of the plaques are shown in Table 4.

TABLE 2

Isocyanate-reactive Components for Example 2

| Component | Quantity (parts by wt.) |
| --- | --- |
| Polyol A | 36 |
| Polyol B | 34 |
| Polyol C | 13 |
| Diamine | 10 |
| Additive A | 1.5 |
| Additive B | 3 |
| Water | 0.9 |
| Catalyst A | 0.5 |
| Catalyst B | 1.1 |

Example 3

The method of Example 2 was repeated except for using a larger relative amount of the aromatic diamine. The composition of the isocyanate-reactive component is shown in Table 3. Physical properties of the plaques are shown in Table 4.

TABLE 3

Isocyanate-reactive Components for Example 3

| Component | Quantity (parts by wt.) |
| --- | --- |
| Polyol A | 32 |
| Polyol B | 30 |
| Polyol C | 11 |
| Diamine | 20 |
| Additive A | 1.5 |
| Additive B | 3 |
| Water | 0.9 |
| Catalyst A | 0.5 |
| Catalyst B | 1.1 |

TABLE 4

Physical Properties for Polyurethane/Polyurea Plaques of Examples 1–3.

| | Examples | | |
| --- | --- | --- | --- |
| | 1 | 2 | 3 |
| Density (g/cm$^3$) | 0.5 | 0.5 | 0.5 |
| Flexural modulus (MPa) | 1028 | 927 | 1003 |
| Heat sag (mm) [6-inch overhang, 121° C., 1 hour] | 6.4 | 3.5 | 1.1 |

The plaques of Examples 2 and 3 according to the invention exhibited superior thermal properties in comparison to the plaque of comparison Example 1.

What is claimed is:

1. A process for preparing a heat-resistant reinforced polyurethane/polyurea foam comprising (A) preparing, at an isocyanate index of 100 to 115, a foamable reaction mixture comprising (a) an organic polyisocyanate;
(b) 0 to 80% by weight, based on the total amount of components (b), (c), and (d), of an isocyanate-reactive compound containing two or more isocyanate-reactive groups and having a number average molecular weight of from 400 to about 10,000;
(c) 10 to 90% by weight, based on the total amount of components (b), (c), and (d), of an isocyanate-reactive compound containing two or more isocyanate-reactive groups other than amino groups and having a molecular weight of from 32 to 399; and
(d) 5 to 35% by weight, based on the total amount of components (b), (c), and (d), of an organic amine containing at least one amino group having a moderated reactivity toward the organic polyisocyanate, as indicated by a gel time exceeding about 5 seconds measured from the material initiation time at 25°–40° C., and having a number average molecular weight of from 86 to 400, said organic amine being selected from the group consisting of
(1) a sterically hindered aromatic amine in which one or more aromatic ring substituents are situated ortho to the amino groups,
(2) an aromatic amine other than amine (d)(1) in which at least one of the amino groups exhibits reduced reactivity due primarily to electronic effects rather than steric factors,
(3) an aromatic or non-aromatic amine having secondary amino groups,
(4) a non-aromatic amine having sterically hindered primary amino groups, and
(5) mixtures thereof; and (B) introducing foamable reaction mixture (A), while said reaction mixture (A) is still fluid, into a mold containing about 12 to about 35% by weight of a fibrous mat having a weight per unit area of about 225 g/m$^2$ to about 750 g/m$^2$.

2. A process according to claim 1 wherein isocyanate-reactive compound (A)(b) is a polyether polyol.

3. A process according to claim 1 wherein isocyanate-reactive compound (A)(b) has a number average molecular weight of from 3000 to 7000.

4. A process according to claim 1 wherein the isocyanate-reactive groups of isocyanate-reactive compound (A)(c) are hydroxyl groups.

5. A process according to claim 1 wherein organic amine (A)(d) has a moderated reactivity toward the organic polyisocyanate as indicated by a gel time of 10 to 45 seconds.

6. A process according to claim 1 wherein organic amine (d) is (1) a sterically hindered aromatic diamine in which one or more aromatic ring substituents are situated ortho to the amino groups; (2) an aromatic diamine other than diamine (1) in which at least one of the amino groups exhibits reduced reactivity due primarily to electronic effects rather than steric factors; (3) an aromatic or non-aromatic diamine having secondary amino groups; (4) a non-aromatic diamine having sterically hindered primary amino groups; or (5) a mixture thereof.

7. A process according to claim 1 wherein 10 to 20% by weight, based on the total amount of components (b), (c), and (d), of organic amine (A)(d) is used.

8. A process according to claim 1 wherein component (A)(b) is absent, the amount of component (A)(c) is 80 to 90% by weight, and the amount of component (A)(d) is 10 to 20% by weight, the amounts of each component being based on the total amount of components (A)(c) and (A)(d).

9. A process according to claim 1 wherein the amount of component (A)(b) is 20 to 80% by weight, the amount of component (A)(c) is 10 to 70% by weight, and the amount of component (A)(d) is 10 to 20% by weight, the amounts of each component being based on the total amount of components (A)(b), (A)(c), and (A)(d).

10. A process according to claim 1 wherein the mold contains 15 to 25% by weight of a fibrous mat.

11. A process according to claim 1 wherein the fibrous mat is a fiberglass mat.

12. A process according to claim 1 wherein the fibrous mat has a weight per unit area of 300 $g/m^2$ to 600 $g/m^2$.

13. A heat-resistant reinforced polyurethane/polyurea foam prepared by the process of claim 1.

* * * * *